United States Patent [19]

Davis

[11] Patent Number: 5,076,040
[45] Date of Patent: Dec. 31, 1991

[54] SEAL BARS HAVING ASYMMETRIC SURFACE FEATURES

[75] Inventor: Steven D. Davis, Yuciapa, Calif.

[73] Assignee: W.A. Lane, Inc., San Bernardino, Calif.

[21] Appl. No.: 665,564

[22] Filed: Mar. 5, 1991

Related U.S. Application Data

[63] Continuation-in-part of Ser. No. 459,518, Jan. 2, 1990, abandoned.

[51] Int. Cl.$^5$ .................. B65B 51/30; B65B 51/14
[52] U.S. Cl. .................. 53/551; 53/374.2; 53/374.5; 53/374.6; 53/374.8; 156/581; 156/583.1
[58] Field of Search .......... 53/371.2, 371.4, 451, 53/477, 551, 554, 550, 373.7, 374.2, 374.4, 374.5, 374.8, 374.6; 156/583.1, 581, 515; 493/206, 209

[56] References Cited

U.S. PATENT DOCUMENTS

| | | | |
|---|---|---|---|
| 2,276,083 | 3/1942 | Moeller | 156/581 X |
| 2,353,746 | 7/1944 | Moore | 53/477 X |
| 2,460,460 | 2/1949 | Langer | 53/477 X |
| 3,045,405 | 7/1962 | Anderson et al. | 53/374.5 X |
| 3,228,170 | 1/1966 | Eisenstadt | 53/554 |
| 3,461,021 | 8/1969 | Brinkmeier et al. | 156/581 X |
| 4,001,075 | 1/1977 | Menzner et al. | 156/581 |
| 4,079,570 | 3/1978 | Rucker | 53/374.2 X |
| 4,254,601 | 3/1981 | Prager et al. | 53/552 X |
| 4,455,808 | 6/1984 | Netzhammer | 53/374.2 X |
| 4,534,818 | 8/1985 | Kreager et al. | 493/194 X |
| 4,582,555 | 4/1986 | Bower | 53/374.2 X |
| 4,617,781 | 10/1986 | Ingersoll et al. | 53/374.4 X |
| 4,682,976 | 7/1987 | Martin et al. | 53/374.8 X |
| 4,768,330 | 9/1988 | Lane, Jr. et al. | 53/374.4 X |
| 4,807,426 | 2/1989 | Smith | 156/581 X |
| 4,949,846 | 8/1990 | Lakey | 53/374.4 X |

*Primary Examiner*—Horace M. Culver
*Attorney, Agent, or Firm*—Herb Boswell

[57] ABSTRACT

A seal for a pouch packaging machine as, for instance, a form, fill and seal packaging machine, includes first and second seal bars each having a sealing surface thereon. The seal bars are located on the machine in positions locating the sealing surfaces on the respective seal bars opposed to one another. In cross section the respective sealing surfaces on the seal bars each include a plurality of concave and convex surface features. The convex surface features have a radius of curvature that is less than the radius of curvature of the concave surface features thus rendering the sealing surfaces asymmetrical.

16 Claims, 3 Drawing Sheets

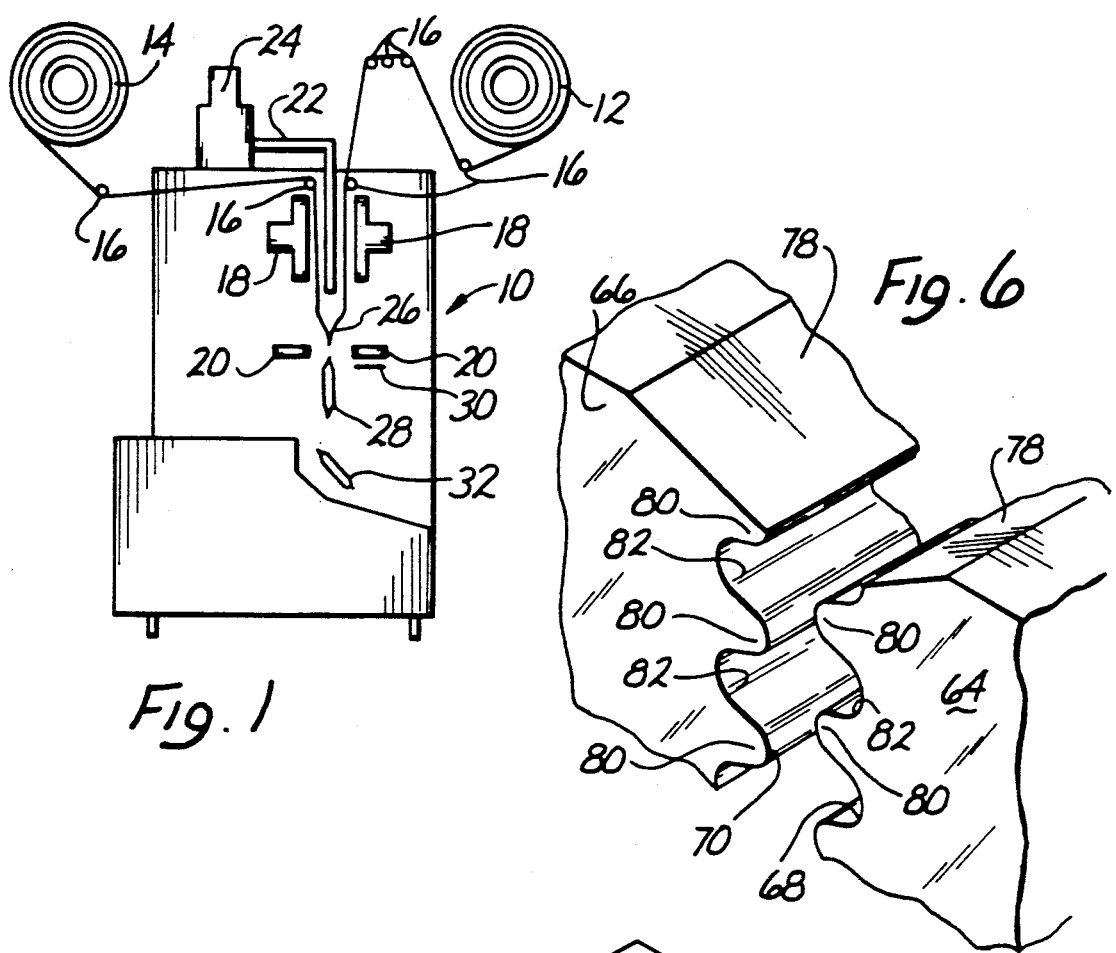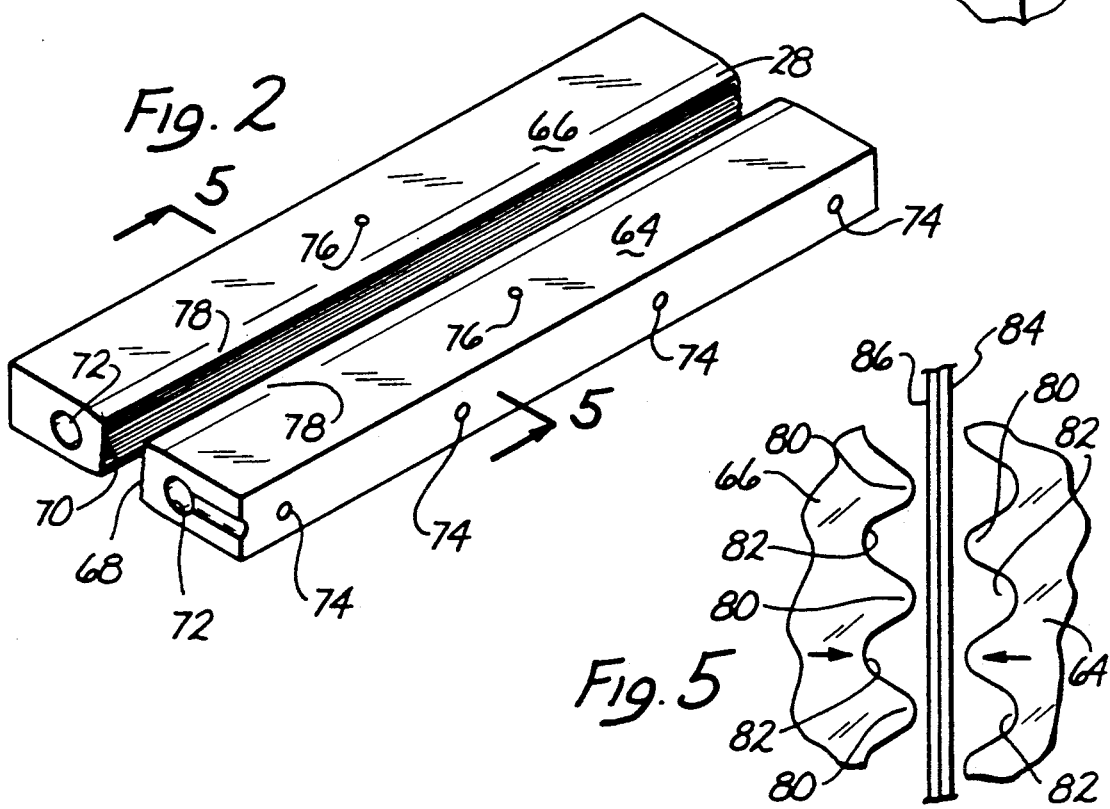

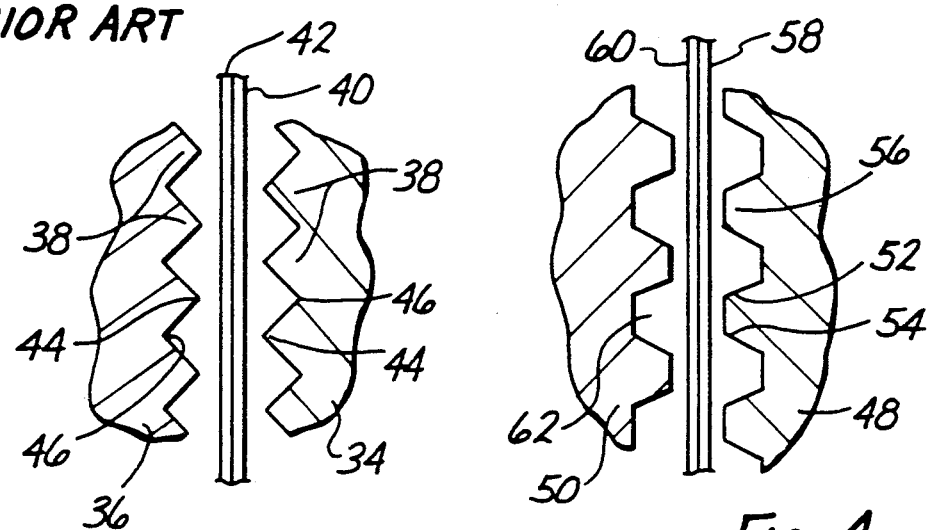
Fig. 3 PRIOR ART
Fig. 4 PRIOR ART
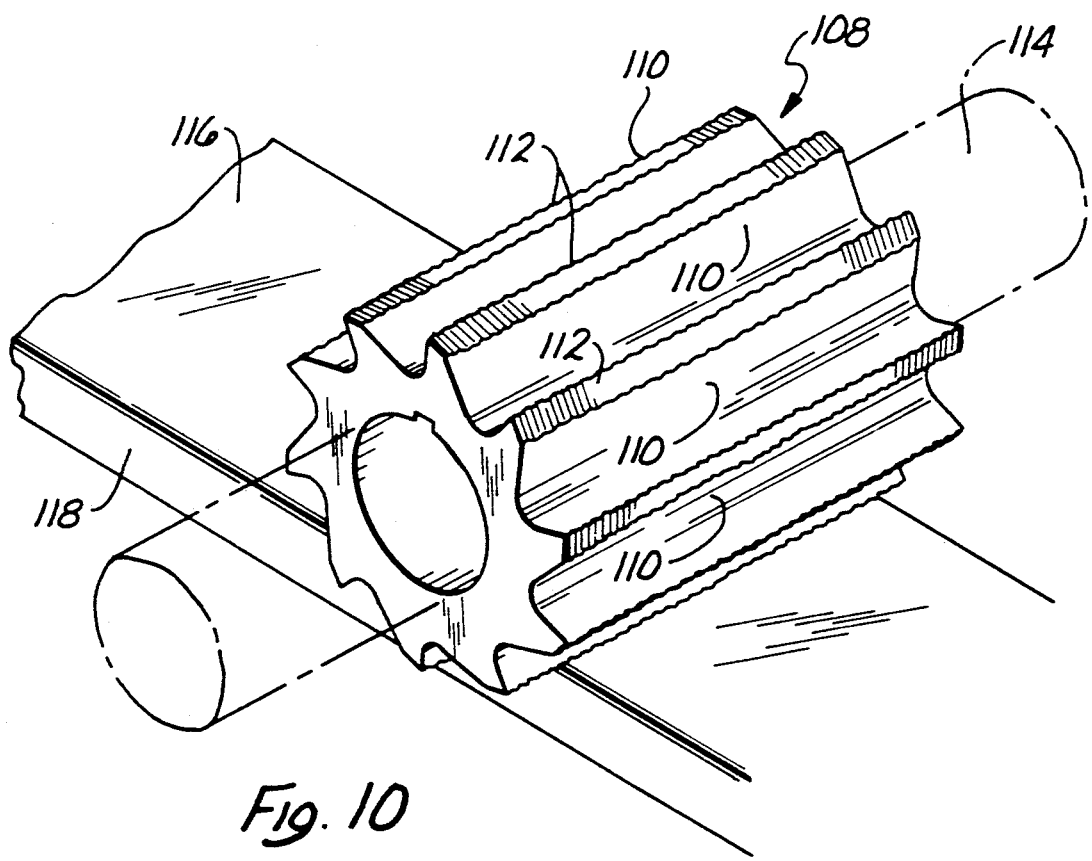
Fig. 10

Fig. 7
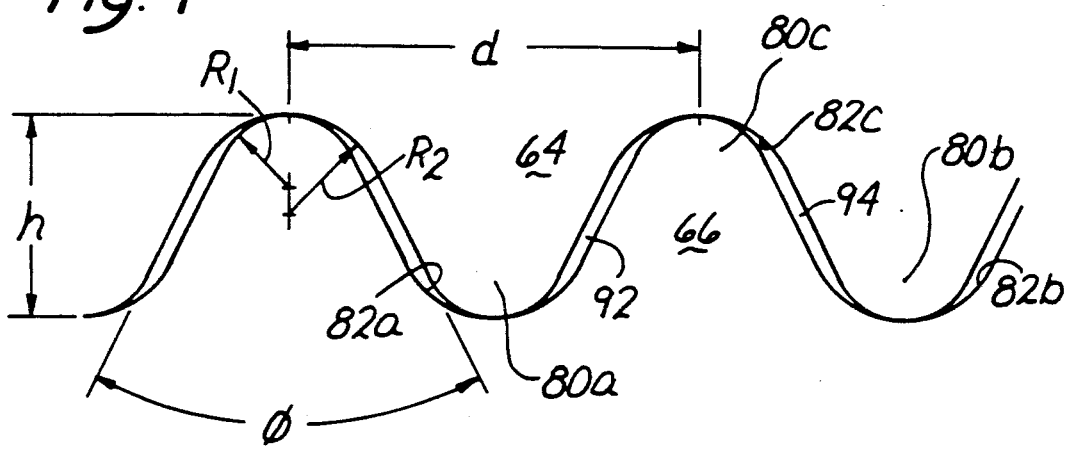
Fig. 8
Fig. 9
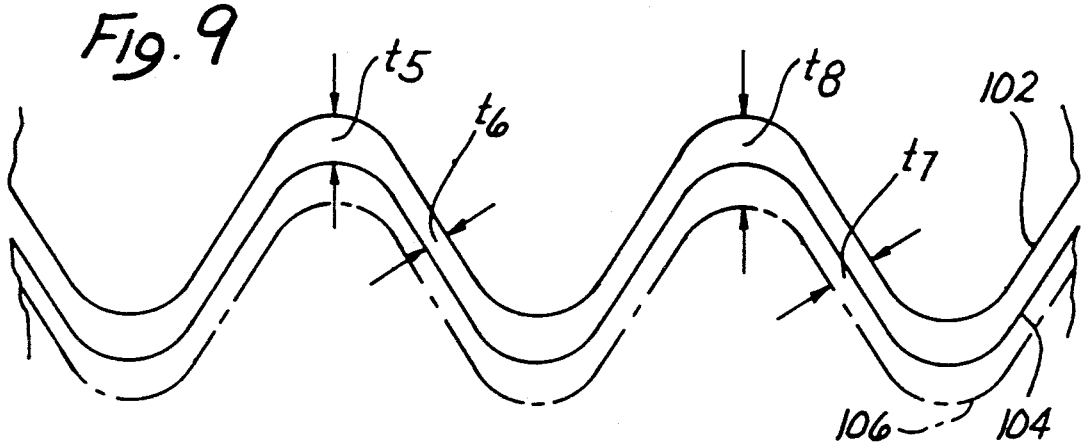

SEAL BARS HAVING ASYMMETRIC SURFACE FEATURES

CROSS REFERENCE TO RELATED APPLICATION

This application is a continuation in part of my prior application Ser. No. 07/459,518, filed Jan. 2, 1990 and now abandoned, and entitled Seal Bars Having Radii Surface Features Thereon which is assigned to the same assignee as this application and which is hereby incorporated by reference.

BACKGROUND OF THE INVENTION

This invention is directed to a seal for a pouch packaging machine. The seal includes first and second seal bars each having a sealing surface thereon. The sealing surfaces on each of the seal bars is an undulating convoluted surface having ridges and grooves. The radius of curvature the grooves is different than the radius of curvature of the ridges.

Many commodities are packaged on form, fill and seal packaging machines. Packaging pouches are formed on these machines from rolls of polymeric and metal foil films or combinations of the same. The pouches are formed, filled, sealed and then disconnected from an advancing stream of pouches being formed on the packaging machine.

In forming these pouches irrespective of the particular packaging film use for a particular pouch, parallel side seams are made between front and back films. These side seams form the sides of individual pouches. Next cross seams perpendicular to the side seams are formed between the front and back films. Each individual cross seam is severed to form a top seam in a bottom most pouch and a bottom seam in the pouch immediately above it on the machine.

The packaging films utilized on form, fill and seal packaging machines to form pouches generally are multilayered films. These packaging films can have anywhere from two to eleven or twelve individual layers. The individual layers of the packaging film are formed of various materials to achieve various packaging results. The materials can include metallic foil films and various polymeric films. Typical polymeric films include polyethylene, polypropylene and nylon films. Typical metal foil films include aluminum foil film.

Typically one or more of the layers of the film that will form the inside of a pouch is engineered by the film manufacturer such that it will soften and flow when subjected to heat and pressure. Both the side seals and the cross seals of a form, fill and seal pouch packaging machine heat and pressurize a front and back film together to adhere the corresponding films to one another. Typically during the heat and pressurization by the seals, the interior layers of the packaging film soften and flow such that they adhere to one another to seal the front and back films together to form a pouch.

To augment the seal between the front and back films, typically the sealing surfaces of the seal bars, whether they be side seals or cross seals are knurled with a "saw tooth" or "square wave" pattern. This stretches the films about the area in which they are sealed together. This stretching increases the surface area of the seal between the films and to some extent mechanically interlocks the front and back films to each other.

In pouches that are designed to have permanent seals, the knurls formed utilizing a knurled sealing surface are normally elongated in a direction parallel to the edge of the pouch that is being sealed such that the mechanical impressions incorporated onto the pouch by the knurled sealing surfaces run parallel with the edge of the pouch. This provides additional strength to the seal by inhibiting tearing of the seal perpendicular to the parallel knurled surface left in the pouch by the seal. Since a perpendicular tear must go across each of the knurls or furls formed on the sides of the pouch, this strengthens the sides of the pouch.

While the presently utilized saw tooth or square wave knurl patterns utilized on the sealing surfaces of the seal bars for pouch packaging machines contributes to increasing the strength of the final seal formed on the pouch, these knurled surfaces are not without their problems.

Especially with metal foil films saw tooth or square wave sealing surfaces tend to fracture the films during sealing. The fractures typically occur along the angular areas of these sealing surfaces because maximum stress of the films occurs at these areas. This stress can lead directly to film fracture.

Additionally, the films tend to stick to the seals about angular areas. This requires the use of a Teflon blanket or other non stick blanket over the sealing surfaces of the seals to prevent sticking of the packaging film to the sealing surfaces.

BRIEF DESCRIPTION OF THE INVENTION

It is a broad object of this invention to provide seals for pouch packaging machines of the type having sealing surfaces that do not include any angular areas thereon wherein stress fracturing of the packaging film can occur. It is a further object of this invention to provide seals that are simple in construction and that do not require the use of release blankets over their surface. It is a further object to provide sealing surfaces that are asymmetrical with the asymmetry being introduced by the incorporation of surface features on the sealing surfaces that have different radii of curvature.

These and other objects as will become evident from the remainder of this specification are achieved in a seal for a pouch packaging machine that includes first and second opposing seal bars with a first sealing surface on said first seal bar and a second sealing surface on said second seal bar. A plurality of alternating groves and ridges are formed on the first sealing surface and in a same manner a plurality of alternating grooves and ridges are formed on the second sealing surface. Each of the grooves has a concave surface formed as a radius of curvature and each of the ridges has a convex surface formed as a radius of curvature. The radius of curvature of the grooves is different than the radius of curvature of the ridges. The first and second seal bars are positional with respect to one another such that the ridges on the first sealing surface align with and fit into the grooves on the second sealing surface and simultaneously the ridges on the second sealing surface align with and fit into the grooves of the first sealing surface; however, since the radius of curvature of the ridges is different than the radius of curvature of the grooves when the ridges fit into the grooves a void area is created in areas between the sealing surfaces. By making the radius of curvature of the ridges less than the radius of curvature of the grooves, when the ridges fit into the grooves the void area is created in areas midway between the apices of the ridges and the nadirs of the grooves. Preferably the radius of the ridges is from about 10% to about 25% less than the radius of the grooves.

Preferably the grooves and ridges on the first sealing surface are parallel with one another as are the grooves and ridges on the second sealing surface. The grooves on the first sealing surface directly converge with the ridges on the first sealing surface to form an asymmetrical sinusoidal shape in cross section. The grooves and ridges of the second sealing surface likewise form an asymmetrical sinusoidal shape in cross section. The ridges on the first sealing surface are in registry with the grooves on the second sealing surface and the ridges on the second sealing surface are in registry with the grooves on the first sealing surface.

The sealing surfaces of both the first and second seal bars are devoid of any acute or any obtuse angles. That is they have no angular discontinuities therein. As so formed the grooves and ridges of the first and second surfaces form undulating non-angular surfaces.

The objects of the invention are also implemented in a seal for a pouch packaging machine that includes first and second elongated seal bars with the first seal bar having a first sealing surface thereon and the second seal bar having a second sealing surface thereon. Each of the first and second sealing surfaces include a plurality of concave and convex surface features with these surface features formed as radii of curvature in at least one direction. The radius of curvature of the convex surface features is less than the radius of curvature of the concave surface features.

BRIEF DESCRIPTION OF THE DRAWINGS

This invention will be better understood when taken in conjunction with the drawings wherein:

FIG. 1 is an elevational view of a form, fill and seal pouch packaging machine of the type that utilizes the seal bars of the invention;

FIG. 2 is an isometric view of first and second seal bars of the invention;

FIG. 3 is a cross sectional view of a first prior art seal bar;

FIG. 4 is a cross sectional view of a second prior art seal bar;

FIG. 5 is a fragmentary cross sectional view about the line 5—5 of FIG. 2;

FIG. 6 is a fragmentary isometric view of the seal bars of FIG. 2 showing the area of the seal bars near the upper center portion of the left hand side of the seal bars as seen in FIG. 2;

FIG. 7 is a schematic cross section view of the sealing surfaces of the seal bars of the invention similar to FIG. 5 except in FIG. 7 certain of the sealing surface dimension have been exaggerated and distorted in size to better show certain features of these sealing surfaces;

FIG. 8 is a view similar to FIG. 7 except the sealing surface are shown in several other spatial orientations compared to the orientation depicted in FIG. 7;

FIG. 9 is a view similar to FIG. 8 except it illustrates symmetrical sealing surfaces as opposed to the asymmetrical sealing surface of the invention; and FIG. 10 is an isometric view of a cutter utilized for forming the sealing surfaces in the seal bars of FIGS. 2, 5, 6, 7 and 8.

This invention utilizes certain principles and/or concepts as are set forth in the claims appended hereto. Those skilled in the arts to which this invention pertains will realize that these principles and/or concepts are capable of being utilized in a variety of embodiments that may differ from the exact embodiment utilized for illustrative purposes herein. For this reason this invention is not to be construed as being limited to only the illustrative embodiments but should only be construed in view of the claims.

DETAILED DESCRIPTION OF THE INVENTION

FIG. 1 shows a typical form, fill and seal pouch packaging machine 10. Loaded on the machine 10 is a front roll of packaging film 12 and a rear roll of packaging film 14. Packaging film from the rolls 12 and 14 is feed across feed rollers collectively identified by the numeral 16 to an area between side seals 18. The side seals 18 come together to form parallel side seams for a pouch or sets of side seams for side by side pouches being formed on the machine 10.

Located below the side seals 18 are a set of cross seals 20. Like the side seals 18, the cross seals come together to seal the packaging film from the rolls 12 and 14 together to form a cross seam that is perpendicular to the side seams. Located above the cross seal 20 is a fill tube 22 leading from a product reservoir 24. After a cross seam is formed by the cross seals 20, product from the product reservoir 24 is fed via the fill tube 22 to the partially completed pouch being formed, filled and sealed on the machine 10.

After the partially completed pouch is filled with product the films from the rolls 12 and 14 are indexed, the side seams are then formed in the advancing film, and once again the cross seals 20 are activated. The next formed cross seam concurrently forms a bottom seam in the partially formed pouch 26 surrounding the fill tube 20 and a top seam in the descending completed pouch 28. Located in association with the cross seal 20 is a knife 30 that severs the completed pouch 28 from the pouch immediately above it that has yet to be filled with product and have its top cross seam formed.

The machine 10 is operated in a continuous manner such that a plurality of pouches are continually formed, filed, sealed and discharges from the machine as is represented by pouches 28 and further pouch 32.

Both the side seals 18 and the cross seals 20 are operated such that they squeeze the front and back packaging films together under pressure. Further, both the side seals 18 and cross seals 20 include heaters (not separately shown or identified) located in association with the seals such that the film is also heated as it is pressurized. The seam formed between the films is thus formed under both heat and pressure.

FIG. 3 shows a prior art "saw tooth" knurled pattern on a front and back seal 34 and 36 respectively. The seals 34 and 36 could be a set of front and back side seals or they could be a set of front and back cross seals. Individual elongated prism shaped teeth collectively identified by the numeral 38 are formed in a saw tooth like manner on the surface of the seals 34 and 36.

When the seals 34 and 36 are brought together such that they squeeze and pressurize a front packaging film 40 and a rear packaging film 42 together, interior layers (not separately shown or identified) in the films 40 and 42 are heated and flow together to seal the films 40 and 42 together.

It is evident from inspection of FIG. 3 that peaks (or in three dimensional space—elongated edges), as for instance, peak 44 on the front seal 34, fit into troughs 46 formed on the back seal 36. This is because the saw tooth pattern in the seal 34 is complementary to the saw tooth pattern in the seal 36 with the peaks on the seal 34 corresponding to troughs on the seal 36 and the peaks on the seal 36 corresponding to troughs on the seal 34.

When the seals 34 and 36 are brought together, initially the peaks on both the seals 34 and 36 engage the films 40 and 42 respectively. The peaks 44 represent an angular area that engage the packaging film. When the seals 34 and 36 are further brought to bear against the films 40 and 42, the films 40 and 42 are stretched tightly across the peaks 44 on the seals 34 and 36. Pressure imparted to the films 40 and 42 by the peaks 44 is very localized at the area of the peaks. This stretches the films across these areas more than it stretches the films between these areas. This can introduce stress and cause fracturing of the packaging film 40 and 42 about the peak areas 44. This is most pronounced when metal foil containing packaging films are utilized.

FIG. 4 shows a further prior art seal. In FIG. 4 front seal 48 and rear seal 50 are formed with "square wave" patterns in cross section on their sealing surface. For the device of FIG. 3 the angle across the peaks 44 is normally about 90 degrees. For the device of FIG. 4, in place of having one sharp edge at the peaks 44, two edges 52 and 54 are created on each tooth 56 of the square wave like pattern created on the seals 48 and 50.

In sealing a front packaging film 58 to a rear packaging film 60 in the device of FIG. 4, while the films are not stretched across as sharp an edge as they would be by the seal of FIG. 3, they still are stretched across an angular edge. In fact they are stretched across two such angular edges, edges 52 and 54, on each of the teeth of the saw tooth like pattern of the device of FIG. 4. The angle at both edges 52 and 54 is an obtuse angle, but it is still an angle. Thus when a tooth 56 pushes the films 58 and 60 into a trough 62, the films 58 and 60 are still subjected to areas of localized stretch and strain about the edges 52 and 54 that again induces stress into the packaging film about those points. The stress at the edges 52 and 54 can also lead to stress fracturing especially in metal foil containing films.

For both of the devices of FIGS. 3 and 4, because the sealing surfaces of the seals 34 and 36 and the seals 48 and 50 have sharp or angular edges, it is necessary to utilized a Teflon tape across the sealing surface to get a clean release of the packaging film after it has been sealed by the seals, i.e. seals 34 and 36 or seals 48 and 50. The use of such Teflon tape adds to the complexity of operation of the device in that it requires systematic replacement requiring human intervention as well as the expense of the tape itself.

In this invention the sealing surfaces of opposing seal bars are modified such that no angular areas or edges are utilized on the sealing surfaces. Illustrated in FIG. 2 is a front seal bar 64 and a rear seal bar 66. The front seal bar 64 includes a sealing surface 68 located thereon and in a like manner the rear seal bar 66 includes a sealing surface 70 located thereon.

Typically the seal bars 64 and 66 are formed of a hard metal. Preferably for use in this invention the seal bar 64 and 66 would be formed of titanium or other similar metal that would render the sealing surfaces 68 and 70 hard and unyielding.

Each of the seal bars 64 and 66 are elongated bars having ends. Each of the seal bars include a heater channel opening collectively identified by the numeral 72 that runs along the elongated length of the respective seal bars recessed back from the respective sealing surfaces 68 and 70. An appropriate resistance heater (not separately shown or identified) would be located in the heater channel 72 for heating the respective seal bars 64 and 66 when they are mounted on an appropriate form, fill and seal pouch packaging machine, as for instance the machine 10 of FIG. 1.

Additionally the seal bars 64 and 66 would include appropriate mounting holes collectively identified by the numeral 74 that are threaded for receiving appropriate bolts (not separately shown or identified) for mounting the bars 64 and 66 to a pouch packaging machine, as for instance the machine 10. Furthermore, openings collectively identified by the numeral 76 can be provided in the bars 64 and 66 for location of appropriate thermocouples or other devices (not separately shown or identified) for maintaining the seal bars 64 and 66 at a constant even elevated temperature.

The seal bars 64 and 66 just adjacent to their sealing surfaces 68 and 70, respectively, are tapered about an area 78 from a first width across the majority of the seal bar to the width of the sealing surfaces 68 and 70. This allows for increasing the width of the seal bars about the heater channel 72 while maintaining the sealing surfaces 68 and 70 of a width of about ⅛ to ⅜ inches wide depending upon the size of the pouch that is being sealed with the seal bars.

The seal bars incorporating the sealing surfaces of the invention can be used either for the side seals or cross seals or both. If the seal bars are used as a cross seal, the width of the seal bar will be greater allowing for the simultaneous formation of both a bottom and a top seam on adjacent pouches being formed on a machine, as for instance, the machine 10.

FIG. 6 shows a fragmentary portion of the seals 64 and 66 of FIG. 2 taken on the left hand side of FIG. 2 about the upper area of the sealing surfaces 68 and 70 near the tapered area 78. It is evident from FIG. 6 that the sealing surfaces 68 and 70 form smooth undulating surfaces having a plurality of ridges 80 interleaved with grooves 82. Both the ridges 80 and the grooves 82 are formed as smooth interconnecting radii of curvature; however, as is discussed in greater detail below, asymmetrical features are introduced onto the sealing surfaces by making the radius of curvature of the ridges 80 different from the radius of curvature of the grooves 82.

Compared to FIGS. 3 and 4 it can be seen that the sealing surfaces of the seal bars 64 and 66 contain neither acute nor obtuse angles as are evident in prior art seals of FIGS. 3 and 4. In the seal bars of the invention, the ridges 80 and the grooves 82 converge one into the other about smooth non-angular convergent areas intermediate the ridges and grooves in a manner such that there are no angular areas located on the sealing surfaces 68 or 70—that is the sealing surfaces contain no angular discontinuities thereon. As can be seen in FIGS. 5 and 6 the ridges 80 and the grooves 82 in cross section smoothly change or transform one to the other without any breaks, bends, creases, folds or angles. As can be further seen in FIG. 2 the ridges 80 and grooves 82 extend along the elongated axis of the seal bars completely across the elongated dimension of the seal bar 64 and 66.

FIG. 5 shows the undulating sealing surfaces of the seals 64 and 66 as seen in cross section taken about the line 5—5 of FIG. 2. The sealing surfaces on both the seal bars 64 and 66 undulate across the seal bars to form a sinusoidal shape in cross section across the totality of the width of the sealing surface; however, because of differences in the radii of curvature of the features on the sealing surfaces 68 and 70 this sinusoidal shape is not perfectly symmetrical. Except for this asymmetry, as is evident in both FIGS. 5 and 6, the sealing surfaces on the seal bars 64 and 66 "generally" are in registry with or are complementary with each other. This allows them to mate with one another other—that is each ridge 80 on the seal bar 64 is directly opposed to a groove 82 on the seal bar 66 and each ridge 80 on the seal bar 66 is directly opposed to a groove 82 on the seal bar 64.

The asymmetry on the sealing surfaces of seal bars 64 and 66 is achieved via a difference in the radius of curvature of the ridges 80 (see radius "$R_1$" in FIG. 7) compared to the radius of curvature of the grooves 82 (see radius "$R_2$" in FIG. 7). The radius of curvature of the ridges 80 is chosen to be smaller than the radius of curvature of the grooves 82. Because the radii of curvature of the ridges 80 and grooves 82 differ, the ratio of relative distances of different points on the opposing sealing surfaces 68 and 70 change as the distance between the sealing surfaces 68 and 70 change.

For the purposes of understanding the invention, as is discussed in greater detail below with respect to FIGS. 7 and 8 if the sealing bars 64 and 66 and their sealing surfaces 68 and 70 are isolated from the dynamic environment of machine 10 and if the sealing bars 64 and 66 are mated together without any packaging film being positioned in-between them, the sealing surfaces of the bars 64 and 66 do not intimately contacting each other along the totality of their surface areas. Because of this in the dynamic environment of the machine 10 as the sealing surfaces 68 and 70 approach each other the packaging film being sealed together is not stressed about areas where the film is curved around radii. During sealing, at the apices and nadirs of the radii of curvature of ridges and grooves, respectively, the sealing surfaces to not actually meet. As a result of this the packaging film especially metal foil containing packaging film is subjected to essentially no stretch and thus little stress. Such metal foil containing packaging film are very prone to stress fracturing. With the asymmetrical sealing surfaces of the invention such stress fracturing is essentially eliminated. This results in the formation of improved seams in packaging films.

To achieve the unique geometrical orientation of the sealing surfaces 68 and 70 of the invention that results in formation of improved seals in packaging film, for the sealing bars 64 or 66 the radius of curvature of the ridges 80 will be from about 10% to about 25% smaller than the radius of curvature of the grooves 82. Preferably the radius of curvature of the ridges 80 will be from about 10% to about 20% smaller. An even more preferred difference in this radius of curvature is about 13% to about 15%, i.e. radius of curvature of the ridges 80 is from about 13% to about 15% smaller than the radius of curvature of the grooves 82.

While I do not wish to be bound by theory, it is my present belief to further avoid film fracture the radius of curvature of the ridges 80 should be at least about 150% (1.5 times) the thickness of the packaging film being sealed, e.g. for 0.010 inch thick packaging film a radius of curvature of (0.015 inches is selected. This ratio of radius of curvature to film thickness can also be expressed utilizing the film thickness as the reference. When expressed in this manner the radius of curvature of the ridges is 66% (0.66 times) the thickness of the packaging film.

Having selected the radius of curvature of the ridges 80 from the film thickness (or the film thickness from the radius of curvature of the ridges 80) then the radius of curvature of the grooves 82 are chosen using the above described differences between the radius of curvature between the ridges and the grooves.

Further I have found that the angle (see angle $\phi$ in FIG. 7) between the sides of the faces of the grooves 82 should always be less than 70 degrees. If this angle is greater than 70 degrees than friction between the films being sealed and the sealing surfaces can tear the packaging film.

Additionally while I do not wish to be bound by theory, to make the sealing bars 64 and 66 self-aligning, the spacing distance (dimension "d" in FIG. 7) between adjacent ridges 80 (or adjacent grooves 82) should be greater than any maximum amount of "wiggle" or "slop" the sealing surfaces 68 and 70 of the sealing bars 64 and 66, respectively, would experience in moving with respect to each other on the machine 10. Such "wiggle" or "slop" is movement of the seal bars 64 and 66 relative to one another inherently introduced because of working and lubrication tolerances in the components of machine 10 that move the sealing bars 64 and 66.

The sealing bars are cantilevered via the mounting holes 74 to other components. Those components in turn must move on the machine 10 and to move they must have working and lubrication clearance between components. For example in FIG. 5 in moving towards and away from each other during a sealing cycle the sealing surfaces 68 and 70 might have a maximum range of horizontal "wiggle" of 0.030 inches with respect to each other. Again while I do not wish to be bound by theory, I have found that the distances between the ridges 80 (see distance "d" of FIG. 7) on the sealing surfaces 68 and 70 should be chosen to be about at least twice the "wiggle" distance, preferably slightly greater, as for example 0.065 inches. Thus if a maximum horizontal "wiggle" or misalignment between the opposing sealing bars 64 and 66 occurred, a ridge 80 while not perfectly aligned with a groove 82 would intersect the opposing sealing face (in reality the packaging film held against that sealing face) along the slope leading to that groove and would be channeled or guided along that slope into the groove. As so designed the sealing bars 64 and 66 become self aligning.

Having set the radii of curvatures of both the ridges 80 and grooves 82, the angle of the grooves and the distance between adjacent ridges, the remaining variable describing the cross sectional geometry of the sealing surfaces, the ridge height, is then selected to accommodate these other design parameters. This ridge height (see dimension "h" in FIG. 7) is the dimension as viewed in cross section between a tangent line that intersects the ridges at their apices and a further tangent line parallel to the first that intersects the grooves at their nadirs—otherwise stated the perpendicular distance from the top of a ridge to the bottom of a groove.

In an embodiment of the invention, for sealing bars 64 and 66 that are of a size wherein the radius of curvature of the ridges 80 on the sealing faces 68 and 70 is 0.013 inches and the radius of curvature of the grooves 82 on the sealing faces 68 and 70 is 0.015 inches, the groove angles is about 62 degrees and the distance between adjacent ridges is 0.065 inches, the above described ridge height would be about 0.0275 inches. In such an embodiment the radius of curvature of the grooves 82 is about 14% greater than the radius of curvature of the ridges 80. This results in improved seals formed in packaging films, especially metal foil packaging film, that are essentially free of stress fractures and other seal defects.

In FIGS. 7 and 8 various lines are used to represent the sealing surfaces 68 and 70 on the seal bars 64 and 66. Further, to better illustrate the asymmetrical shape and fit of the sealing surfaces 68 and 70 no packaging film such as the films 84 and 86 have been positioned between the sealing surfaces 68 and 70. For illustration in these figures, this allows the sealing surfaces 68 and 70 to "artificially" contact each other. In actual operation of the sealing bars 64 and 66 on the machine 10 they would never directly contact each other but would be separated by the packaging film that is being sealed between them.

Additionally for clarity of the mode of the operation of the sealing bars of the invention, in FIGS. 7 and 8 (and FIG. 9 as well) certain features have been exaggerated via dimensional distortions. Thus in FIGS. 7 and 8 the radii of curvatures of the ridges and grooves is exaggerate and other dimensions likewise distorted compared to the actually dimension delineated above. By making such exaggerations the asymmetry of the surface structure of the sealing surfaces are extrapolated to the scale of the drawings and the changes resulting from this asymmetry is evident by visual inspection of the drawings. The same has been done in FIG. 9 with respect to certain symmetrical sealing surfaces.

As seen in FIG. 7 when the radius of curvature of the grooves 82 is greater than the radius of curvature of the ridges 80 this allows the apices of the ridges 80 to contact the nadirs of the grooves 82 but at points midway between a ridge apex and a groove nadir a space is formed between the opposing sealing surfaces. Thus at the apex of a first ridge 80-$a$ on sealing surface 68 contact is made at the nadir of the groove 82-$a$ on sealing surface 70. Also at the apex of ridge 80-$b$ on sealing surface 68 contact is made at the nadir of the groove 82-$b$ on sealing surface 70 and, in a like manner, at the apex of ridge 80-$c$ on sealing surface 70 contact is made at the nadir of groove 82-$c$ on sealing surface 68. However at midpoint 92 in-between ridge 80-$a$ and groove 82-$c$ (or looking at both bars together at the midpoint 92 between ridges 80-$a$ and 82-$c$) and midpoint 94 in-between ridge 80-$b$ and groove 82-$c$ there is no contact between the sealing surfaces 68 and 70 At the midpoints 92 and 94 the sealing surface 68 of sealing bar 64 is spaced away from the sealing surface 70 of sealing bar 66. This is also true for the remainder of the ridges 80 and grooves 82 on the sealing surfaces 68 and 70.

In FIG. 8, lines 96 and 98 depict the sealing surfaces 68 and 70, respectively, when they are spaced apart from one another about the apices of the ridges 80 and nadirs of the grooves 82 a distance $t_1$ that is equal to the thickness of the packaging film that is to be sealed between them. On lines 96 and 98 the distance between lines 96 and 98 about the midpoints is the distance $t_2$. Because of the asymmetry of the sealing surfaces 68 and 70, on lines 96 and 98 at the midpoint areas this distance $t_2$ is slightly less than the distance $t_1$, i.e. slightly less than the thickness of the packaging film that would be located between the sealing surfaces.

Further in FIG. 8 lines 96 and 100 depict the sealing surfaces 68 and 70 when they are spaced further apart one from the other about the midpoints a distance $t_3$ that is equal to the thickness of the packaging film that is being sealed between them (or looking at it in a different perspective utilizing my above described preferred ratio of the radius of the ridges to packaging film thickness—a distance that is equal to about 0.66 the radius of curvature of the ridges). Across the apices of the ridges 80 and the nadirs of the grooves 82 the distance between the sealing surfaces is now distance $t_4$.

Because of the asymmetry of the sealing surfaces 68 and 70 the distance $t_4$ is slightly greater than distance $t_3$, i.e. the thickness of the packaging film being sealed. For lines 96 and 100, if both the sealing surfaces 68 and 70 were in intimate contact with packaging film about the midpoints (at a distance $t_3$ from each other) then these same sealing surfaces 68 and 70 at the areas where the apices of the ridges align with the nadirs of the grooves (at a distance $t_4$ from each other) would not contact each other but would be spaced apart from each other by the distance $t_3$ plus an incremental amount. This incremental amount would be equal to $t_4$ minus $t_3$.

It is evident in comparing FIG. 7 to FIG. 8 that because of the asymmetry of the sealing surfaces 68 and 70 a "cross-over" occurs in moving from FIG. 7 to FIG. 8. This cross-over is a cross over of the relative distance between the distance across the apices of the ridges to the nadirs of the grooves compared to the distance between the midpoints. In FIG. 7 the distance between the sealing surfaces 68 and 70 about the midpoints is greater than the distance between an apex of a ridge and the nadir of the aligning groove on the opposite sealing surface. In contrast in FIG. 8 the distance across the apices of the ridges to the nadirs of their aligning grooves is greater than the distance at the midpoints.

As a result of the asymmetry of the sealing surfaces 68 and 70 at some distance that lies between the lines 92 and 94 of FIG. 7 and the lines 96 and 98 of FIG. 8 the distance between sealing surfaces 68 and 70 would be constant along the totality of these sealing surfaces. It is at this distance that the cross-over occurs. It is at this distance that the distance across aligning midpoints is equal to the distance across aligning ridges and grooves. For the sake of a reference for comparison with FIG. 9 this distance can be identified as an "overall equal sealing surface spacing." For comparing with FIG. 9 below it can be observed that this overall equal sealing surface spacing occurs when the sealing surfaces 68 and 70 are spaced apart some positive distance that, in using the packaging film thickness as a reference, is less than the thickness of the packaging film being sealed or, in using the ridge radius as a reference and my preferred ratio of the ridges to the packaging film, is less than 0.66 times the radius of the ridges 80. This overall equal sealing surface spacing thus occurs at a distance less than distance $t_1$ or $t_3$.

When the distance between the sealing surfaces 68 and 70 are beyond the cross-over point and are greater than the "overall equal sealing surface spacing," then in looking at the pairs of lines 96 and 98 and 96 and 100 of FIG. 8, the distance (see distances $t_3$ and $t_4$ of FIG. 8) between opposing points on the opposite sealing surfaces 68 and 70 as measured perpendicular to the sealing surface or perpendicular to a tangent line about curved areas of the sealing surfaces are not equal across the totality of the sealing surfaces. The distance $t_4$ is greater than the distance $t_3$. This is compared to FIG. 7 wherein the distance from the apex of a ridge to nadir of its aligning groove was less than the midpoint distance.

Again while I do not wish to be bound by theory, as a result of distance $t_4$ being greater than distance $t_3$, when a seal is formed in the packaging material, as the sealing surfaces 68 and 70 approach each other they contact the packaging film and begin to shaped it to their curving surfaces. The film bends around the ridges 80 and is pushed by these ridges into the grooves 82. At the point depicted by lines 96 and 100 of FIG. 8, the packaging film has been pushed by the sealing surfaces 68 and 70 until it is now in intimated contact with these surfaces at the midpoints but not where the apices of the ridges align the nadirs of the grooves. Movement of the sealing surface 68 (as represented by line 100) in moving from the position of line 100 towards sealing surface 66 (represented by line 96) results in pressure being transferred to the packaging film without stretch of the packaging film.

Pressurization of the packaging film and compaction of it to the thickness represented by the lines 96 and 98 allows for compaction of the packaging film at the midpoints to a degree represented by distance $t_2$ while maintaining the distance between the sealing surfaces at the apices of the ridges 80 just at the thickness of the packaging film. Thus the packaging film at the apices of the ridges 80 is not stretched around these apices. By not being stretched the packaging film is not subjected to stress fracturing and thus retains its integrity. Compaction at the midpoints does not result in stretch of the packaging film—thus at the midpoints the packaging film also retains its integrity.

In FIG. 9 a like situation to that illustrated in FIG. 8 is depicted except in FIG. 9 as opposed to the asymmetrical sealing surface of the invention, symmetrical sealing surfaces are illustrated.

In one construction of FIG. 9, line 102 can be construed as representing two symmetrical sealing surface that are abutted one to the another. Thus it would be equivalent to a sealing surface on one sealing bar being tightly pressed against or abutted against a sealing surface of a mating sealing bar. Such symmetrical sealing surfaces would have the radius of curvature of their ridges equal to the radius of curvature of their grooves. Further such construction results in the distance between the sealing surfaces being equal across the apices of the ridges and the nadirs of the grooves compared to the distance across midpoints. At this position for the symmetrical sealing surfaces of FIG. 9, with line 102 representing both the sealing surfaces of opposing sealing bars, these sealing surfaces are positioned in what was referred to above as an "overall equal sealing surface spacing." However, while the sealing surfaces of this structure would fit perfectly against one another when they are abutted directly together, such a construction does not depict reality since it does not provide for any geometrical space between the seal bar for any packaging film to be located in.

For the symmetrical sealing surface represented by line 102 of FIG. 9, the only time they are in an "overall equal sealing surface spacing" is when they are abutted one against the other. As soon as the symmetrical sealing surface of FIG. 9 are moved apart one from the other they no longer exist in such an "overall equal sealing surface spacing" nor can they ever be in such an "overall equal sealing surface spacing" when they are other then in an abutted relationship.

In FIG. 9, lines 102 and 104 can be construed as representing two symmetrical sealing surfaces that are spaced a part a distance $t_5$ sufficient to provide a spacing between the apices and the nadirs of the ridges and grooves that is equal to the thickness of a packaging film that is being joined. Distance $t_5$ thus corresponds to distance $t_1$ of FIG. 8. However, while the distance between the apices of the ridges and the nadirs of the grooves of FIG. 9 is equal to the packaging film thickness, the distance $t_6$ at midpoints is much less than the packaging film thickness.

The distance $t_6$ is approximately only one half the thickness of the packaging film distance $t_5$. Compared to FIG. 8 the distance $t_6$ of FIG. 9 is only a fraction of the distance $t_2$ of FIG. 8. Thus with the symmetrical sealing surfaces of FIG. 9 in order to position opposing ridge apices and groove nadirs of the sealing surfaces apart from each other a distance equal to the packaging film thickness allowing an initial contact of both the opposing sealing surfaces against the packaging film at the areas of the ridge apices and groove nadirs of the grooves, excessive pressure must be applied to the midpoint areas. If the lines 102 and 104 represented actual sealing surfaces having packaging film between them, such packaging film would be adversely over pressurized and thus stressed about the midpoints. This packaging film would be subject to rupture at these overly stress points.

In FIG. 9 when the distance at the midpoint areas, distance $t_7$, is equal to the thickness of the packaging film, the distance across the apices of the ridges and the nadirs of the grooves, distance $t_8$, has expand to about twice the thickness of the packaging film. At this point in space it can be seen that when pressure to form a seal at the midpoint areas is just starting to be applied, absolutely no pressure can be applied to the packaging film at the areas where the apices of the ridges oppose the nadirs of the grooves. Indeed the individual sheets of the packaging film might still be spaced away one from the other or still might not be in contact with the sealing surfaces because of the large gap still evident between the sealing surfaces. If material or other physical characteristics of the packaging film being used makes it impossible to compress the packaging film to the degree required to compress it to the thickness represented by distance $t_6$, then the sealing surface of the seal bars would never subjected the packaging film to any pressurization about the apices and nadirs of the ridges and grooves and thus would form a poor or an incomplete seal at these points. Metal foil containing film is a film that does not stand up to excessive pressurization and thus would be a poor choice of film to use with symmetrical sealing surfaces.

As opposed to the situation depicted by lines 102 and 104 of FIG. 9 wherein the packaging film would be stressed and would rupture, in the situation depicted by lines 102 and 106 of FIG. 9 while the packaging film may maintain its integrity, the seal would be poor. The seal of lines 102 and 106 would be weak and thus would be prone to rupture, delamination, air entrapment or leakage. Irrespective whether it is the packaging film that is stressed or the seal that is stressed, in both situations depicted by lines 102 and 104 or lines 102 and 106 of FIG. 9, in those packaging situations wherein a strong, permanent, leak proof seal is desired, the sealing surfaces of FIG. 9 have deficiencies.

As opposed to the symmetrical sealing surfaces of FIG. 9 that only achieved an "overall equal sealing surface spacing" when they are abutted together, for the asymmetrical sealing surfaces of the invention as seen in FIGS. 7 and 8, as a minimum, the "overall equal sealing surface spacing" will occur at some positive distance. The exact distance where equal spacing between the sealing faces 68 and 70 occurs is dependent on the ratio of the radius of curvature of the ridges and grooves. Thus when the radius of the ridges and the radius of the grooves are chosen such that when the first and the second seal bars 64 and 66 are spaced away from each other a positive distance but a distance that is less than about 0.66 times the radius of said convex surface features (as determined using my above referenced preferred ratio of the radius of the ridges to the thickness of the packaging film), then the distance between opposing points on said first and second sealing surfaces 68 and 70 as measured perpendicular to the sealing surfaces or perpendicular to tangent lines about curved areas of the convex and concave surface features on the sealing surfaces is approximately equal across the totality of the sealing surfaces. However in order to reduce stress imparted at the ape of the ridges especially in metal foil packaging film sealing of the packaging film should occur at a point where the sealing surface are spaced apart a distance slightly greater than the "overall equal sealing surface spacing." Taking in to account film stretch and compression, these conditions occur in my above describes ranges of the ratio of the ridges to the grooves with the most preferred ratio being that were the radius of curvature of the ridges is from 13% to 15% less than the radius of curvature of the grooves.

Because there are no sharp angles on the sealing surfaces 68 and 70 of the seals 64 and 66, there is no need to use a Teflon release tape on the sealing surfaces 68 and 70. Further, the seal bars 64 and 66 are very useful on hard to seal films, as for instance, metal foil packaging films that are subject to stress fracturing when sealed with prior seals, as for instance, those of FIGS. 3 and 4.

Again while I do not wish to be bound by theory, the asymmetry of the sealing surfaces 68 and 70 removes and then maintains exclusion of any air between the opposing film surface. This is in direct contrast to seals formed in packaging film utilizing the prior art sealing bars of FIGS. 3 and 4. Further I have found that I can increase sealing pressure by as much as 40% to 50% compared to prior known sealing bars without rupture of the packaging film. Such increase in pressure further strengths the seal formed in the packaging film. All of these improvements contribute to better seals that are imperforate, leak proof and do not delaminate.

FIG. 10 shows a typical cutter 108 that is utilized to form the asymmetrical undulating surface of the seals of the invention. The cutter 108 has a plurality of teeth collectively identified by the numeral 110. Each tooth 110 has a sinusoidal pattern 112 machined into it. The cutter 108 is keyed to a shaft 114 and is rotated by the shaft 114 against an edge 116 of material stock 118 that is being machined into a seal bar of the invention.

The pattern 112 of the teeth 110 of the cutter 108 are mirror images of the ridges 80 and grooves 82 of the sealing bars 64 and 66. Thus while in the sealing bars 64 and 66 the ridges have smaller radii of curvature compared to the grooves, in the cutter 108 the opposite situation is present. In the cutter 108, the ridges of the pattern 112 have a greater radius of curvature than the grooves of the pattern 112. The cutter 108 thus has an asymmetrical sinusoidal shaped in its teeth 110 that is the mirror image of the asymmetrical sinusoidal shaped of the sealing surfaces 68 and 70.

Since the sinusoidal pattern 112 on the cutter teeth 110 do not have to include sharp angular areas necessary to create the bottom of the troughs 46 of the prior art device of FIG. 3 or the corresponding edges of the troughs 62 of the prior art device of FIG. 4, the sealing pattern of the invention, i.e. the undulating wave like pattern, can be cut into harder material as, for instance titanium. This allows advantage to be taken of the use of such harder material like titanium. This is opposed to the use of softer materials such as aluminum alloys for prior art seal bars.

The use of more exotic materials as, for instance, titanium, results in increased life span of the seal bars of the invention without degradation of their sealing surfaces caused by wear and the like. Further, since the sealing surfaces of the seal bars of the invention do not include sharp angular areas as, for instance, the areas about the peak 44 of the prior art device of FIG. 3 that are naturally subject to increased wear, the seal bars of the invention have an inherently greater longevity.

I claim:

1. A seal for a pouch packaging machine comprising:
    a first and second opposing seal bars; a first hard unyielding non-angular sealing surface on said first seal bar;
    a second hard unyielding non-angular sealing surface on said second seal bar;
    a plurality of alternating groves and ridges formed on said first sealing surface;
    a plurality of alternating grooves and ridges formed on said second sealing surface;
    each of said grooves having a concave surface formed as a radius of curvature and each of said grooves having a nadir;
    each of said ridges having a convex surface formed as a radius of curvature and each of said ridges having an apex;
    said first and said second seal bars being positional with respect to one another such that said ridges on said first sealing surface are in registry with and can be engaged with said grooves on said second sealing surface and simultaneously said ridges on said second sealing surface are in registry with and can be engaged with said grooves on said first sealing surface; and
    the radius of curvature of said ridges being different from the radius of curvature of said grooves with said radius of said ridges and said radius of said grooves being chosen such that when said first and said second seal bars are spaced away from each other a positive distance equal to about 0.66 times the radius of said ridges as measured perpendicular from the surface of said first seal bar essentially midway between a ridge apex and a groove nadir of an immediately adjacent ridge and groove on said first seal bar towards said second seal bar then the distance between said seal bars as measured from the apex of a ridge on said first seal bar towards the nadir of a groove on said second seal bars in registry with said ridge on said first seal bar is greater than said 0.66 times the radius of said ridges.

2. A seal of claim 1 wherein:
    each of said first and said second seal bars is elongated having ends;
    said first sealing surface extending on said first seal bar along the elongated dimension of said first seal bar between said ends of said first seal bar;
    said grooves and ridges on said first sealing surface continuous formed on the totality of said first sealing surface;

said second sealing surface extending on said second seal bar along the elongated dimension of said second seal bar between said ends of said second seal bar; and said grooves and ridges on said second sealing surface continuous formed on the totality of said second sealing surface.

3. A seal of claim 2 wherein:

said grooves and said ridges on said first bar extend parallel with one another along the elongated dimension of said first seal bar; and said grooves and said ridges on said second bar extend parallel with one another along the elongated dimension of said second seal bar.

4. A seal of claim 1 wherein:

the angle between the walls of said grooves is less than 70 degrees.

5. A seal of claim 1 wherein:

said concave surface of said grooves of said first sealing surface directly converge with said convex surface of said ridges of said first sealing surface to form an asymmetrical sinusoidal shape in cross section through said first sealing surface; and said concave surface of said grooves of said second sealing surface directly converge with said convex surface of said ridges of said second sealing surface to form an asymmetrical sinusoidal shape in cross section through said second sealing surface.

6. A seal of claim 1 wherein:

said first and said second sealing surfaces are devoid of any acute and any obtuse angles.

7. A seal of claim 1 wherein:

said grooves and ridges of said first sealing surface form an undulating continuous surface having no angular or other discontinuities therein; and said grooves and ridges of said second sealing surface form an undulating continuous surface having no angular or other discontinuities therein.

8. A seal for a pouch packaging machine comprising:

first and second elongated seal bars;

a hard undulating non-angular unyielding first sealing surface on said first seal bar;

a hard undulating non-angular unyielding second sealing surface on said second seal bar;

said first and said second sealing surfaces each including a plurality of concave and convex surface features; and the radius of curvature of said convex surface features being less than the radius of curvature of said concave surface features by an amount such that when said first and second seal bars are spaced apart from each other by a positive reference distance essentially to the thickness of packaging film to be sealed with said seal and where said reference distance is measured perpendicular from a surface feature on said first seal bar essentially midway between an apex of a convex surface feature and a nadir of an immediately adjoining concave surface feature towards said second seal bar then the distance between said seal bars as measured from the apex of a convex surface feature on said first seal bar towards the nadir of a concave surface feature on second seal bars that is in registry with said first seal bar convex surface feature is greater than said reference distance.

9. A seal of claim 8 wherein:

said unyielding undulating non-angular first and second sealing surfaces each contain a plurality of elongated ridges and a plurality of elongated grooves, said grooves and ridges interspaced between one another; and said ridges connecting to said grooves about smooth non-angular convergent areas.

10. A seal of claim 8 wherein:

said ridges are formed as convex radii of curvature in cross section normal to their elongated dimension; and said grooves are formed as concave radii of curvature in cross section normal to their elongated dimension; and said ridges connecting to said grooves about smooth non-angular convergent areas.

11. A seal of claim 8 wherein:

said unyielding undulating non-angular first and second sealing surfaces each are formed as asymmetric sinuously undulating connected convex radii of curvature and concave radii of curvature with said convex radii of curvatures and said concave radii of curvatures interleaved between one another;

said asymmetry resulting because of as the differences of the radii of curvature of said convex and said concave surface features; and said non-angular first and said second sealing surfaces being devoid of any acute and any obtuse angles.

12. In combination with a pouch packaging machine of the type that forms pouches from packaging film, a seal comprising:

first and second elongated seal bars;

a first sealing surface on said first seal bar;

a second sealing surface on said second seal bar;

said first and said second sealing surfaces each including a plurality of concave and convex surface features;

said surface features each formed as a radius of curvature whereby each of said convex surface features has an apex and each of said concave surface features has a nadir; and the radius of curvature of said convex surface features being less than the radius of curvature of said concave surface features by an amount such that when said first and second seal bars are spaced apart from each other by a reference distance essentially equal to the thickness of said packaging film and where said reference distance is measured perpendicular from a surface feature on said first seal bar essentially midway between an apex of a convex surface feature and a nadir of an immediately adjoining concave surface feature towards said second seal bar then the distance between said seal bars as measured from the apex of a convex surface feature on said first seal bar towards the nadir of a concave surface feature on second seal bars in registry with said first seal bar convex surface feature is greater than said reference distance.

13. A seal of claim 12 wherein:

the radius of curvature of said convex surface features are from about 10 to 20 percent smaller than the radius of curvature of said concave surface features.

14. A seal of claim 13 wherein:

the radius of curvature of said convex surface features are from about 13 to about 15 percent smaller than the radius of curvature of said concave surface features.

15. A seal of claim 12 wherein:

each of said first and second sealing surfaces comprise hard unyielding surfaces.

16. A seal of claim 12 wherein:

each of said first and said second sealing surfaces comprise undulating surfaces.

* * * * *